July 24, 1962  N. E. HAGER, JR  3,045,473
APPARATUS FOR MEASURING THERMAL CONDUCTIVITY
Filed March 26, 1959
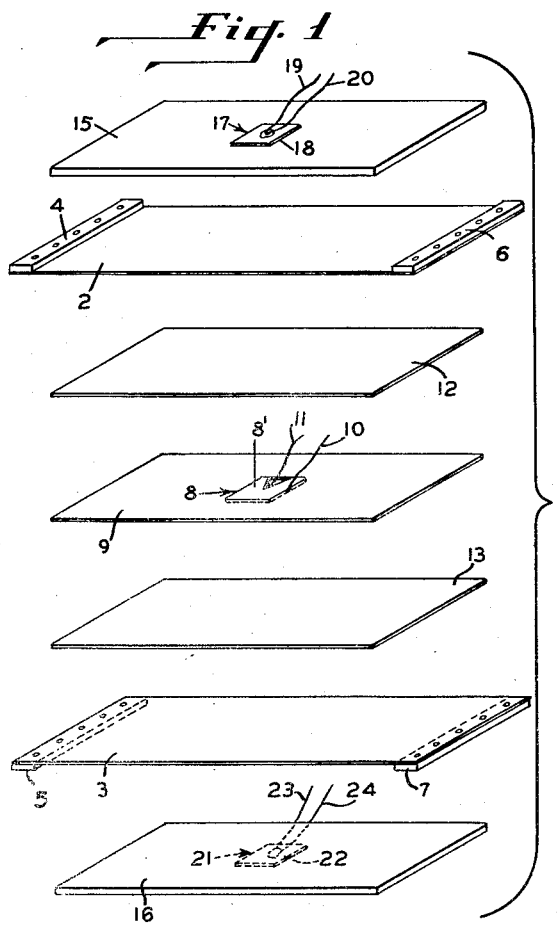
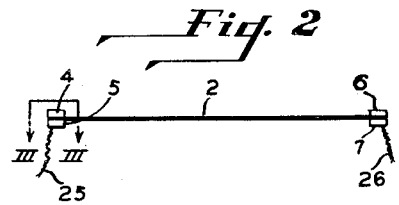
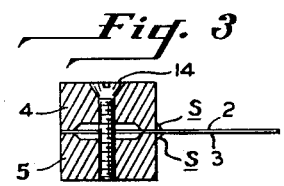
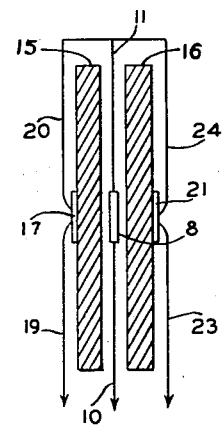
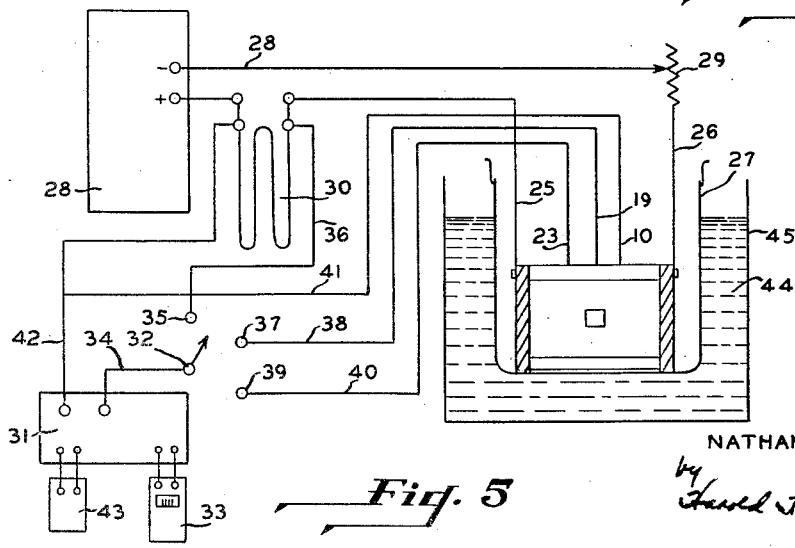
INVENTOR
NATHANIEL E. HAGER, JR.
ATTORNEY 3,045,473
APPARATUS FOR MEASURING THERMAL CONDUCTIVITY Nathaniel E. Hager, Jr., Lancaster Township, Lancaster County, Pa., assignor to Armstrong Cork Company, Lancaster, Pa., a corporation of Pennsylvania
Filed Mar. 26, 1959, Ser. No. 802,141
4 Claims. (Cl. 73—15)

This invention relates to an apparatus for measuring the thermal conductivity of materials such as thermal insulation products, for example, wood, cork composition, plastic sheets, and the like.

The principal object of the invention is to provide a rapidly responsive measuring unit for determining thermal conductivity of materials which will provide accurate and reproducible results and which will be useful over a wide range of temperatures with a wide range of sample thicknesses and thermal conductivity values.

Another object of the invention is to provide an apparatus of the character described which will be relatively easy and inexpensive to construct and to operate.

A further object of the invention is to provide an absolute instrument which does not require the use and maintenance of "standard" samples.

Other objects of the invention will be obvious from consideration of the following description of an embodiment of the invention which is illustrated in the attached drawing, in which:

FIGURE 1 is an exploded view showing the various components which are combined in the heating and temperature-sensing portion of the apparatus and includes samples to be measured;

FIGURE 2 is an edge view in diagrammatic form illustrating the heating unit with the samples to be measured removed;

FIGURE 3 is a sectional view to an enlarged scale taken along the line III—III of FIGURE 2 and showing the clamping arrangement for the heating unit;

FIGURE 4 is a diagrammatic view showing the wiring of the temperature-sensing thermocouples; and FIGURE 5 is a diagrammatic view of the apparatus including an electrical wiring diagram for the heating and temperature-sensing members as well as for the indicating instruments.

The apparatus operates on the principle of passing a constant electrical current through a uniformly thin sheet of metal foil in such a way that the rate of heat generation per unit can be computed from electrical measurements, assuming conservation of energy. Thermal energy thus is generated in the metal foil at a measured rate. Identical samples of measured thickness of the thermal insulation to be measured for thermal conductivity are placed against opposite sides of the foil heater. Thermocouples are positioned to indicate the temperature drop across the central region of each of the samples. The complete assembly is enclosed in an envelope, such as a plastic film, and immersed in a bath having constant and uniform temperature. After equilibrium has been reached, the temperature drops across the samples are measured. All of the data needed to compute the thermal conductivity of the sample material may be obtained from the measurements so obtained.

The proposed method of computation of thermal conductivity using simple equations explained below is valid only when essentially all of the measured energy flows through the samples along lines perpendicular to the plane of the heater. This is accomplished in the present invention by making the heater from a poor heat conductor, by making it very thin, and by keeping the distance from the center where measurements are made to the nearest edge of the heater as large as practicable. If the samples to be measured are to be kept as small as 8" by 10" and if the accuracy of measurement is to be maintained high, then the heater must not transmit heat in a direction parallel with its flat surfaces at a rate significantly exceeding that transmitted by a 3 mil foil of stainless steel or Nichrome. Furthermore, since the heater is to be heated electrically and the energy generated per unit area in the central region is to be determined by measuring the ratio of the total heat generated in the whole heater to the heater area, the heater must be substantially uniform, so that the heat per unit area generated in the central region is approximately equal to the average heat per unit area generated by the heater as a whole. The metal foil should have high electrical resistivity as well as low thermal conductivity. An annealed stainless steel foil produced by the General Plate Division, Metals and Controls Corporation, Attleboro, Massachusetts, and known as its No. 321, has been found to provide the desired physical characteristics. The 10" lengths of this stainless steel were selected from a strip slightly less than 2 mils thick and 8" wide, for use as heater elements in fabrication of a heater. These lengths were reasonably uniform and had an average thickness deviation not much greater than 0.5% from the mean thickness.

The construction of the heater is shown in FIGURES 1, 2 and 3 of the drawing.

The two 8" x 10" pieces of the annealed stainless steel foil had the following thicknesses:

$$0.00171 \pm .00001''$$
$$0.00166 \pm .00001''$$

The measurements were made with a Van Keuren optical micrometer and are reproducible to within 0.00001" provided that the stainless steel film is kept clean. The two 8" x 10" strips of stainless steel are numbered 2 and 3 in FIGURE 1.

Two cooperating pairs of copper bars, 4 and 5, and 6 and 7, 1/4" x 1/2" x 8" (FIGURES 1 and 2), are machined as shown in FIGURE 3 so that each cooperating pair will clamp the stainless steel sheets therebetween along the short edges. It is preferred to use two stainless steel sheets in the heater so that a thermocouple element may be placed inside the heater. This avoids thermal contact problems which would arise if the thermocouple were placed between the heater and the sample to be measured. It is obvious that the temperature sensed by the internal thermocouple will not be significantly different from what it would be if the thermocouple were directly in contact with an outside surface of the heater.

The internal or heater thermocouple element 8 shown in FIGURE 1 comprises a 1" x 1" x 0.005" copper platelet 8' which is received within an opening provided in a sheet 9 of paper tape carrying a layer of pressure-sensitive adhesive on each face. A 0.003" copper wire 10 is soldered to a side edge of the copper platelet 8' and a 0.005" constantan wire 11 is soldered into a V-shaped cut formed in the platelet 8' as shown in FIGURE 1. Two facing sheets 12 and 13 of Mylar (polyethylene terephthalate) film 8" x 10" x 0.001" thick are adhered to the sheet 9 of double-faced, pressure-sensitive tape, on opposite sides thereof. The sandwich made up of elements 9, 12 and 13 is adhered together everywhere except within the area occupied by the thermocouple element 8. The completed assembly is about 0.007" thick.

This thermocouple element assembly is positioned between the metal foil heater members 2 and 3 so that the thermocouple element 8 lies about midway of the length and width of the heaters. The cooperating pairs of copper bars 4 and 5, and 6 and 7, are fastened to the short edges of the metal foil heater members with machine screws 14 which pass through openings provided in one of each of the pairs of bars and are received within threaded openings provided in the other of each pair.

If a measurement of the electrical resistance of the completed heater shows that the resistance is somewhat higher than it should be according to computations based on the known resistivity of the metal, it is an indication of imperfect mechanical contact and with such condition, it is possible that the current would not flow in the necessary uniform manner. If cleaning and extra tightening on the machine screws 14 do not improve the situation, soldering of the bars 4–7 to the metal foil heater members 2 and 3 with a 50–50 soft solder as indicated at S in FIGURE 3 may be necessary to form a better mechanical and electrical contact. If a good electrical contact is made, the resistance of the heater unit should agree with the value computed from a precision measurement of the resistivity of the stainless steel foil to within about 0.1%.

If desired, plastic bars may be added at the long edges to enclose the heater in a rigid frame, but this is not necessary and may present problems if the assembly is subjected to great temperature changes, due principally to differential expansion in the frame and other components of the unit.

FIGURE 1 shows two samples 15 and 16, the thermal conductivity of which is to be measured. These may be pieces about 9″ x 7″ x ¼″ thick of a cork composition material, for instance. Thermocouple elements are mounted on each of the test samples, in the approximate center thereof, as indicated in FIGURE 1. The thermocouple element 17 may be made of a copper platelet 18 about 1″ x 1″ x .005″ thick upon which is mounted a silver soldered thermocouple junction consisting of a copper wire 19 and a constantan wire 20. A similar thermocouple element 21 as shown in dotted lines in the lower portion of FIGURE 1 may be provided on the other test sample 16. The thermocouple element includes a copper platelet 22 upon which is formed a silver soldered junction of a copper wire 23 and a constantan wire 24. These thermocouple elements 17 and 21 may be fastened to the specimens by the use of conventional pressure-sensitive, electrical insulating tape.

The three thermocouple elements 8, 17, and 21 are connected as shown in FIGURE 4 where numbers corresponding to those used in FIGURE 1 have been applied. Stranded copper leads 25 and 26 (FIGURE 2) capable of carrying about 20 amperes are fastened to the copper bars 5 and 7 and the unit is placed in an envelope (FIGURE 5), such as a plastic bag indicated diagrammatically at 27 in FIGURE 5. A bag made of polyethylene film or Mylar film about .003″ thick will serve admirably for this purpose. The Mylar film is preferred for services below Dry Ice temperatures and serves well at liquid nitrogen temperatures at which polyethylene film is excessively fragile.

Referring to FIGURE 5 which shows a typical arrangement for measuring thermal conductivity using the assembly described above, there is provided a regulated power supply 28. This may be a 28-volt Perkin regulated D.C. power supply capable of delivering 10 amperes with the current held fixed to within 0.1%. A wire-wound, 3 ohm, 15 ampere laboratory type rheostat 29 may be included to permit limiting the current to below 10 amperes and avoid overloading the supply. A Leeds and Northrup 0.1 ohm, 15 ampere precision resistor 30 is included in the power circuit to permit measuring the current with a Leeds and Northrup type K–2 potentiometer 31.

A switch 32 is provided permitting the use of the potentiometer 31 for reading the heater current from power supply 28 through resistor 30 and also the thermocouple voltages. This is accomplished through lead 34 from the potentiometer 31 to switch 32 and to point of contact 35 and lead 36 to resistor 30; point of contact 37 and lead 38 to the copper wire 19 of one of the thermocouples attached to a sample to be measured; and point of contact 39 and lead 40 to the copper wire 23 of the other thermocouple attached to the other sample to be measured. A lead 41 extends from the copper wire 10 of the heater thermocouple 8 to the other side of potentiometer 31 through a lead 42 which is connected to one side of the power supply 28. An indicating galvanometer 33 and a standard cell 43 are included as conventional accessories for the precision potentiometer 31.

The unit is completed with a uniform and constant temperature bath 44 for holding the temperature of the cold surfaces of the samples fixed. The bath may be contained in a stainless steel Dewar flask 45 full of water, ice water, Dry Ice and alcohol, liquid nitrogen, or other heat transfer fluid. With samples of cork composition material 15 and 16, the hydrostatic pressure of the liquid 44 against the plastic envelope 27 holds the specimens tightly against the heater elements 2 and 3. If there is any significant vertical temperature gradient within the bath, a stirrer may be provided to circulate the bath.

The following description of the measurement of test samples of a cork composition material will illustrate the use of the apparatus in measuring the thermal conductivity of an insulation product.

The samples are 9″ x 7″ x ¼″ thick, and correspond to samples 15 and 16 of FIGURE 1. Preferably the least dimension, in this case the width dimension of 7″, should be at least ten times the thickness of the sample, in this case ¼″. They are fastened to the heater elements 2 and 3 by use of pressure-sensitive electrical insulating tape disposed partly over the short edges of the samples and partly over the copper bars 4, 5, 6, and 7. In cases where the sample is not flexible enough so that the pressure exerted by the bath can be depended upon to hold the samples firmly against the heater, double-faced, pressure-sensitive, paper tape such as mentioned above for element 9 may be used between the sample and the heater. The tape is only about 4 mils thick, and when the sample is of the order of 250 mils thick the resultant sample thickness error is small and correctible. Both the electrical insulating tape and the double-faced paper tape sold by Minnesota Mining and Manufacturing Company will adhere well enough for these purposes at liquid nitrogen temperatures even though they get brittle. The cold surface thermocouple elements are fastened to the exposed surfaces of the samples at about the midpoint of the length and width dimensions; they correspond to the thermocouple elements 17 and 21 shown in FIGURE 1. The platelets 18 and 22 of thermocouple elements 17 and 21 are secured to the samples by pressure-sensitive electrical insulating tape.

The assembly is disposed in a plastic bag of Mylar and is immersed in a water bath at room temperature. Care should be exercised to be sure that the heater unit and the thermocouples are kept dry. The power supply, potentiometer, indicating galvanometer, and auxiliary equipment are connected as shown in FIGURE 5. After immersion of the heater and test specimens in the bath for a suitable period of time to permit the system to settle down to equilibrium for a zero reading of the cold surface thermocouples, the heater power supply is turned on, and the current supplied to the heater is adjusted to a fixed level through use of rheostat 29; 10 amperes, for example. Thermal equilibrium is reached in the system within about 15 minutes. This can be determined periodically by use of switch 32 which when connected through points of contact 37 or 39 will provide a reading on the potentiometer 31 indicating the temperature differences between the hot and cold surfaces of each of the test samples. When equilibrium has been reached, switch 32 is moved to point of contact 35 and the current supplied to the heater is measured. The switch is moved to point of contact 37 and the difference between the E.M.F.'s generated by thermocouples 8 and 17 is noted. From this net E.M.F. the temperature difference between the two surfaces of sample 15 can be computed from standard thermocouple tables. Next the switch is moved to point of contact 39 and the difference between the E.M.F.'s generated by thermocouples 8 and 21 is noted so that the temperature difference between the two surfaces of sample 16 can be determined. The temperature of the bath is also recorded. With these data consisting of the two thermocouple readings, the heater current at equilibrium, the sample thicknesses, and the bath temperature, the thermal conductivity of the test samples may be computed from a simple equation based on elementary physical principles. For the apparatus described, the thermal conductivity is given by:

$$k = CDI^2/\Delta E$$

where $k$ is the thermal conductivity, D is the average of the two measured sample thicknesses, $\Delta E$ is the average of the two observed thermocouple E.M.F.'s, I is the heater current, and C is a coefficient calculated from the known physical parameters of the heater and the thermocouple system. The coefficient C varies with temperature and is ordinarily evaluated at the bath temperature.

Stainless steel foil was used in the heater elements of the embodiment of the invention described above. Other metals may be substituted for the stainless steel provided they possess the desired physical properties, including high electrical resistivity, low thermal conductivity, and uniformity of thickness.

The materials shown in the following list, if rolled into homogeneous sheets of the desired thickness and uniformity of thickness, are typical of materials which may be used in the construction of the heater elements:

| Material | Electrical Resistivity-ohm-cm. | Thermal Conductivity [1] |
|---|---|---|
| Stainless steel of above example | [2] $76 \times 10^{-6}$ | [3] 112 |
| Nichrome | [4] $100 \times 10^{-6}$ | [5] 90 |
| Constantan, 60% Cu, 40% Ni | [4] $44.6 \times 10^{-6}$ | [5] 157 |
| Manganin | [4] $44 \times 10^{-6}$ | [5] 180 |
| Monel Metal | [4] $42 \times 10^{-6}$ | [6] 160 |

[1] B.t.u.—inches per hour, per square foot, per degree Fahrenheit at room temperature.
[2] By applicant.
[3] From engineering Materials Handbook by C. L. Mantell—McGraw Hill, 1958.
[4] From Handbook of Chemistry and Physics by C. D. Hodgman—Chemical Rubber Publishing Co., 37th edition, 1955.
[5] From Heat Transmission by W. H. McAdams—McGraw Hill, 3rd edition, 1954.
[6] From American Institute of Physics Handbook—McGraw Hill, 1957.

The desired high electrical resistivity and low thermal conductivity are interrelated and generally a material which possesses the desired electrical resistivity will meet the requirements for low thermal conductivity. The rate of heat transmission in a direction parallel with the flat faces of the heater elements is related to the thermal conductivity of the foil and its thickness. The rate of heat transmission should be as small as practicable. It should not significantly exceed that transmitted by a 3 mil foil of stainless steel or Nichrome, as mentioned above, i.e. the heat transmission from the central area, 1" x 1" square, in a direction parallel with the flat surfaces of the foil should not exceed 1% of the total heat generated in such area. The thickness of the foil should be uniform within 1% of the mean thickness. Within these limits, the isothermal condition at the heated surface of the sample under test will be attained to the degree desired.

Theoretically, there is no minimum limit on resistivity or maximum limit on thermal conductivity. The lower the electrical resistivity and the higher the thermal conductivity of the heater foil, the thinner the foil must be to achieve equivalent results. For example, to achieve equivalent results to those attained by use of the stainless steel foil .00166"–.00171" thick of the above example, substituting Monel metal, the Monel metal foil would have to be of a thickness in the order of .0009", or less than 1 mil thick. As a practical matter, it is difficult to go much below 1.5 mil in the thickness of the foil and achieve the desired uniformity in thickness, about 1% deviation from mean thickness. It is not only difficult to form uniformly thin foils much less than 1.5 mil in thickness; it is also difficult with the instruments currently available to measure deviations as low as 1% in materials less than 1.5 mil thick. Metals having an electrical resistivity substantially below 100 and a thermal conductivity substantially greater than about 100, as noted above, will not be selected because they will require a foil thickness below the currently practicable minimum. Materials, such as the selected stainless steel of the example or the Nichrome, each of which has a relatively high electrical resistivity and a relatively low thermal conductivity, are preferred.

By use of the apparatus of the present invention, it is possible easily and inexpensively and with accurate and reproducible results to determine thermal conductivity of materials, such as wood, cork composition, plastic sheets, and the like, over a wide range of temperatures and with a wide range of sample thicknesses and thermal conductivity values. The use and maintenance of "standard" samples is not required and evaluations may be made in a relatively short time as compared with thermal conductivity measuring devices now in use.

I claim:

1. In an apparatus for measuring thermal conductivity utilizing the temperature drop across the thickness of a sample to be measured as a factor, the combination of electrical heater formed of a pair of superimposed stainless steel foils each having a maximum thickness of 3 mils, a maximum deviation from mean thickness of about 1%, and a maximum heat transmission in a direction parallel with the flat surfaces thereof from a central area thereof about 1" x 1" square of about 1% of the total heat generated in such area, pairs of superimposed conductor bars connected to opposite ends of said foils and electrically joining the same, a thermocouple element disposed between said foils in good thermal contact therewith adjacent to the center thereof, means electrically insulating said thermocouple element from said foils, and means for passing a constant electrical current through said heater at a measured rate to generate heat in said heater per unit area in said central area thereof which is essentially equal to the average heat per unit area generated in the heater as a whole.

2. In an apparatus for measuring thermal conductivity of a sample of insulating material utilizing the temperature drop across the thickness of the sample as a factor, an electrical heater having a low heat transmission rate in a direction parallel with its flat faces, high electrical resistivity, low thermal conductivity, and substantially uniform electrical heat generating characteristics and comprising a pair of superimposed electrically connected metal foils, in combination the equivalent of a stainless steel foil having a maximum thickness of 3 mils, a maximum deviation from mean thickness of about 1%, and a maximum heat transmission in a direction parallel with the flat surfaces of the foil from a central area thereof about 1" x 1" square of about 1%, said foils being disposed to receive a temperature-sensing device therebetween, said heater presenting two opposed flat heating surfaces for the reception of samples to be tested, and means disposed at opposite ends of said foils for connecting said heater to a constant source of electrical current.

3. In an apparatus for measuring thermal conductivity of a sample of insulating material utilizing the temperature drop across the thickness of the sample as a factor, the combination of an electrical heater having a low heat transmission rate in a direction parallel with its flat faces, high electrical restivity, low thermal conductivity, and substantially uniform electrical heat generating characteristics and comprising a pair of superimposed electrically connected stainless steel foils having a maximum combined thickness of about 3 mils, a maximum deviation from mean thickness of about 1%, and a maximum heat transmission in a direction parallel with the flat faces from a central area thereof about 1″ x 1″ square of about 1%, a heater thermocouple positioned between and electrically insulated from said foils and disposed in the approximate center thereof and in good thermal contact therewith to sense the temperature of said heater, said heater presenting two opposed flat heating surfaces for the reception of two similar flat samples to be measured, a second thermocouple for sensing the temperature of one of said similar samples at a flat surface thereof parallel to and spaced from the surface disposed in good thermal contact with said heater, a third thermocouple for sensing the temperature of the other of said similar samples at a flat surface thereof parallel to and spaced from the surface disposed in good thermal contact with said heater, means for passing a constant electrical current through said heater at a measured rate to generate heat in said heater per unit area in the zone of said heater thermocouple which is approximately equal to the average heat per unit area generated in the heater as a whole, and means for maintaining the temperature of the surfaces of said samples in the regions of said second and third thermocouples substantially constant, whereby the parallel planes in the central portions of the samples to be measured are each substantially isothermal surfaces.

4. An apparatus for measuring thermal conductivity of a pair of samples as defined in claim 3 in which the electrical heater, heater thermocouple, the second thermocouple for sensing the temperature of one of said similar samples, the third thermocouple for sensing the temperature of the other of said similar samples, and said samples are disposed in a thin plastic envelope and in which the means for maintaining the temperature of the surfaces of said samples in the regions of said second and third thermocouples substantially constant comprises liquid means operable by engagement with said plastic envelope for establishing good thermal contact with said samples and providing a uniform temperature at the central area at least of the flat face of each of said samples remote from said heater.

References Cited in the file of this patent
UNITED STATES PATENTS

| | | |
|---|---|---|
| 2,475,138 | Hood et al. | July 5, 1949 |
| 2,484,736 | Razek | Oct. 11, 1949 |
| 2,600,485 | Cox | June 17, 1952 |
| 2,808,351 | Colbert et al. | Oct. 1, 1957 |
| 2,961,522 | Hammer | Nov. 22, 1960 |

OTHER REFERENCES

Symposium on Thermal Insulating Materials, published by the American Society for Testing Materials, March 12, 1952; copy in Patent Office Scientific Library.

UNITED STATES PATENT OFFICE
CERTIFICATE OF CORRECTION

Patent No. 3,045,473                                   July 24, 1962

Nathaniel E. Hager, Jr.

It is hereby certified that error appears in the above numbered patent requiring correction and that the said Letters Patent should read as corrected below.

Column 1, line 49, after "unit" insert -- area --; column 2, line 19, for "The" read -- Two --; column 6, line 73, for "restivity" read -- resistivity --.

Signed and sealed this 13th day of November 1962.

(SEAL)
Attest:

ERNEST W. SWIDER                                     DAVID L. LADD
Attesting Officer                                         Commissioner of Patents